United States Patent
Yuk et al.

(10) Patent No.: US 8,982,799 B2
(45) Date of Patent: Mar. 17, 2015

(54) CONFIGURING FREQUENCY BANDS TO BE SCANNED IN A MULTIPLE-FREQUENCY-BAND WIRELESS LAN

(71) Applicant: Samsung SDS Co., Ltd., Seoul (KR)

(72) Inventors: Young Soo Yuk, Seoul (KR); Yang Hwan Joe, Seoul (KR)

(73) Assignee: Samsung SDS Co., Ltd., Seoul (KR)

( * ) Notice: Subject to any disclaimer, the term of this patent is extended or adjusted under 35 U.S.C. 154(b) by 0 days.

(21) Appl. No.: 14/290,988

(22) Filed: May 30, 2014

(65) Prior Publication Data
US 2014/0362782 A1    Dec. 11, 2014

(30) Foreign Application Priority Data
Jun. 7, 2013    (KR) .................. 10-2013-0065454

(51) Int. Cl.
  *H04W 4/00*       (2009.01)
  *H04W 72/04*      (2009.01)
  *H04W 36/00*      (2009.01)
(52) U.S. Cl.
  CPC ................................. *H04W 72/0406* (2013.01)
  USPC ............................ 370/328; 455/434; 455/436
(58) Field of Classification Search
  None
  See application file for complete search history.

(56) References Cited

U.S. PATENT DOCUMENTS

| | | | |
|---|---|---|---|
| 2009/0111466 A1* | 4/2009 | Montemurro et al. | 455/434 |
| 2011/0038357 A1* | 2/2011 | Gong | 370/338 |
| 2012/0039325 A1* | 2/2012 | Buckley et al. | 370/338 |
| 2012/0300759 A1* | 11/2012 | Patanapongpibul et al. | 370/338 |
| 2013/0033995 A1* | 2/2013 | Kraglund et al. | 370/252 |
| 2014/0328334 A1* | 11/2014 | Viswanathan et al. | 370/338 |

* cited by examiner

*Primary Examiner* — Clemence Han
(74) *Attorney, Agent, or Firm* — Sughrue Mion, PLLC

(57) ABSTRACT

Provided is a communication method implemented by a mobile device in a wireless network in which a plurality of frequency bands is available, wherein a first wireless device and a second wireless device in the wireless network are configured to use a first one and a second one of the plurality of frequency bands, respectively, to provide wireless connections. The method includes: while the mobile device is connected to the second wireless device, receiving a frame which includes information indicating that the first wireless device is configured to use the first frequency band to provide a wireless connection, the frame being transmitted from the first wireless device in the second frequency band and received through a scanning operation performed by the mobile device only on the second frequency band; and allowing a subsequent scanning operation of the mobile device to be performed only on the first frequency band.

18 Claims, 4 Drawing Sheets

CONFIGURING FREQUENCY BANDS TO BE SCANNED IN A MULTIPLE-FREQUENCY-BAND WIRELESS LAN

CROSS-REFERENCE TO RELATED APPLICATION

This application claims priority to and the benefit of Korean Patent Application No. 10-2013-0065454, filed on Jun. 7, 2013, the disclosure of which is incorporated herein by reference in its entirety.

BACKGROUND

1. Field

The present disclosure relates to wireless network technology, and more particularly, to technology for setting a frequency band to be scanned in a wireless local area network (WLAN) in which a plurality of frequency bands are used.

2. Discussion of Related Art

Recently, a demand for mobile devices has been drastically increased. Mobile devices communicate radio signals with access points (APs) that provide access to a wireless network through defined frequency channels. A typical example of such a wireless network that provides a service for a mobile device is a WLAN, which is widely used for business purposes, public facility-related purposes, personal purposes, and so on. The Institute of Electrical and Electronics Engineers (IEEE) 802.11 standard for a WLAN mainly covers a physical layer and a media access control (MAC) layer.

A WLAN system includes one or more basic service sets (BSSs). A BSS is a set of stations that can be synchronized to communicate with one another. In a broad sense, the stations include AP stations and non-AP stations. For the sake of convenience, however, an AP station may be simply referred to as an AP and a non-AP station as a station. Meanwhile, a non-AP station may also be referred to as a mobile station (MS), a mobile terminal, user equipment (UE), or the like.

FIG. 1 schematically shows an exemplary configuration of a WLAN.

As shown in FIG. 1, stations 152 and 154 may access a WLAN 100 via APs 111, 113, 115, 117, 121, 123, and 125. For example, the access to the WLAN 100 may be performed according to a protocol of the IEEE 802.11 standard. Such a WLAN 100 as mentioned above is referred to as an infrastructure network. In the WLAN 100, each of the APs 111, 113, 115, 117, 121, 123, and 125 manages the station(s) 152 and/or 154 associated with itself as one or more entities constituting a BSS. The APs 111, 113, 115, 117, 121, 123, and 125 are identified by basic service set identifiers (BSSIDs).

The exemplary WLAN 100 includes a distribution system (DS) that interconnects the plurality of APs 111, 113, 115, 117, 121, 123, and 125 and provides an extended service set (ESS), although it is not shown in FIG. 1. As a mechanism for one AP to communicate with another AP, such a DS enables an AP to transmit a frame to stations connected to a BSS managed by the AP, deliver a frame to a station that has moved to another BSS, or deliver a frame over an external network such as a wired network. As such, APs and stations included in one ESS may communicate with one another. In other words, a single ESS may be considered as a single logic network segment present in one Internet protocol (IP) subnet. Such an ESS is identified by a service set identifier (SSID). As shown in FIG. 1, the SSID "mobile" is an identifier indicating the WLAN 100 and is transmitted from the APs 111, 113, 115, 117, 121, 123, and 125 as information indicating the presence of the WLAN 100. According to the IEEE 802.11 standard, an SSID may be signaled using a management frame named a beacon frame or another one named a probe response frame.

Under such a scenario, the stations 152 and 154 may roam between the different APs 111, 113, 115, 117, 121, 123, and 125 having the same SSID. In other words, in the WLAN 100 (SSID: mobile), the stations 152 and 154 may move from one BSS to another BSS through roaming. For example, when the station 152 connected to the AP 113 moves and a communication signal from the AP 113 is attenuated, the station 152 attempts to connect to another AP (e.g., the AP 115) to change its connection point before the connection to the AP 113 is completely lost. In a preparatory process for such roaming, the station 152 scans frequency bands (e.g., the 2.4 GHz frequency band and the 5 GHz frequency band) used for wireless connections in the WLAN 100 to search for an AP that sends a signal at a satisfactory level. The scanning may follow either an active scanning mode or a passive scanning mode. According to the active scanning mode, the stations 152 and 154 transmit probe request frames and then wait for probe response frames. According to the passive scanning mode, the stations 152 and 154 wait for beacon frames from the APs 111, 113, 115, 117, 121, 123, and 125. For example, the station 152 discovers the AP 115 from which a beacon frame or a probe response frame is received at a higher strength, selects the AP 115 as an AP to which a new connection is to be made, and sends a reassociation request frame to the AP 115.

It is of primary importance to improve the communication performance of a mobile device in a wireless network (e.g., WLAN) for providing a service to the mobile device. Particularly, for an application such as voice over IP (VoIP) or video conference that actually requires real-time delivery of voice/image traffic, it is necessary to maintain such a traffic flow in a stable manner. In addition, it is preferable to prevent degradation of the communication performance caused by radio interference in some frequency band for use in wireless connections in the wireless network.

SUMMARY

According to an exemplary embodiment, there is provided a communication method implemented by a mobile device in a wireless network in which a plurality of frequency bands is available, wherein a first wireless device and a second wireless device in the wireless network are configured to use a first one and a second one of the plurality of frequency bands, respectively, to provide wireless connections, the communication method including: while the mobile device is connected to the second wireless device, receiving a frame which includes information indicating that the first wireless device is configured to use the first frequency band to provide a wireless connection, the frame being transmitted from the first wireless device in the second frequency band and received through a scanning operation performed by the mobile device only on the second frequency band; and in response to receiving the frame, allowing a subsequent scanning operation of the mobile device to be performed only on the first frequency band.

The frame may have an identical format as a management frame which is received by the mobile device so as to be used in a scan to search for a connectable wireless device in the wireless network.

The frame may be a beacon frame or a probe response frame.

The information may be included in the frame as a guide service set identifier (SSID).

The guide SSID may be unavailable to indicate a network accessible by the mobile device.

The frame may be different from a management frame which includes an SSID indicating presence of the wireless network and which is transmitted from the first wireless device.

The plurality of frequency bands may include a 2.4 GHz band and a 5 GHz band.

The wireless network may be a wireless local area network (WLAN) conforming to an Institute of Electrical and Electronics Engineers (IEEE) 802.11 standard, both of the first wireless device and the second wireless device may be access points (APs) compatible with the IEEE 802.11 standard, and the mobile device may be a mobile station compatible with the IEEE 802.11 standard.

According to another exemplary embodiment, there is provided a computer-readable storage medium having computer executable instructions stored thereon which implement the above-described communication method.

According to another exemplary embodiment, there is provided a communication method implemented by a wireless device in a wireless network in which a plurality of frequency bands is available, the wireless device being configured to use a first one of the plurality of frequency bands to provide wireless connections, the communication method including: generating a frame which includes information indicating that the wireless device is configured to use the first frequency band to provide a wireless connection; and transmitting the frame in the first frequency band and a second one of the plurality of frequency bands such that the frame is received by a mobile device performing a scanning operation only on the first frequency band and by another mobile device performing a scanning operation only on the second frequency band.

The frame may have an identical format as a management frame which is transmitted by the wireless device so as to be used in a scan to search for a connectable wireless device in the wireless network.

The frame may be a beacon frame or a probe response frame.

The information may be included in the frame as a guide service set identifier (SSID).

The guide SSID may be unavailable to indicate a network accessible via the wireless device.

The frame may be different from a management frame which includes an SSID indicating presence of the wireless network and which is transmitted from the wireless device.

The plurality of frequency bands may include a 2.4 GHz band and a 5 GHz band.

The wireless network may be a wireless local area network (WLAN) conforming to an Institute of Electrical and Electronics Engineers (IEEE) 802.11 standard, the wireless device may be an access point (AP) compatible with the IEEE 802.11 standard, and the mobile devices may be mobile stations compatible with the IEEE 802.11 standard.

According to another exemplary embodiment, there is provided a computer-readable storage medium having computer executable instructions stored thereon which implement the above-described communication method.

BRIEF DESCRIPTION OF THE DRAWINGS

The above and other objects, features, and advantages of the present disclosure will become more apparent to those familiar with this field from the following detailed description when taken in conjunction with the accompanying drawings, in which.

DETAILED DESCRIPTION OF EXEMPLARY EMBODIMENTS

Hereinafter, detailed embodiments of the present disclosure will be described with reference to drawings. However, the embodiments are merely examples and are not to be construed as limiting the present disclosure.

Various details already understood by those familiar with this field will be omitted to avoid obscuring the gist of the present disclosure. Terminology described below is defined considering functions in the present disclosure and may vary according to a user's or operator's intention or usual practice. Thus, the meanings of the terminology should be interpreted based on the overall context of the present specification.

The spirit of the present disclosure is determined by the claims, and the following exemplary embodiments are provided only to efficiently describe the spirit of the present disclosure to those familiar with this field.

Figure 2:
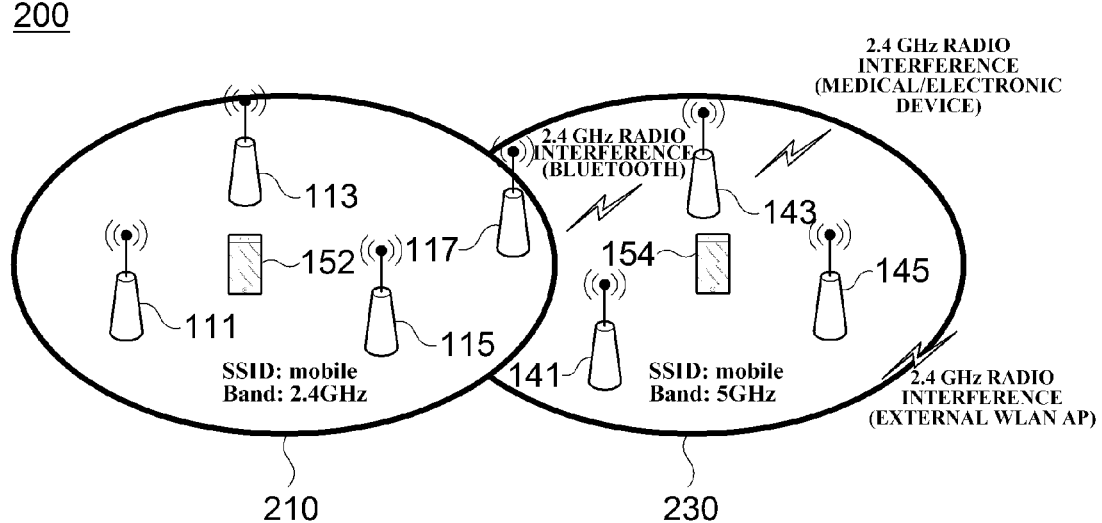
FIG. 2 schematically shows an exemplary configuration of a WLAN.

FIG. 2 schematically shows an exemplary configuration of a WLAN.

Figure 1:
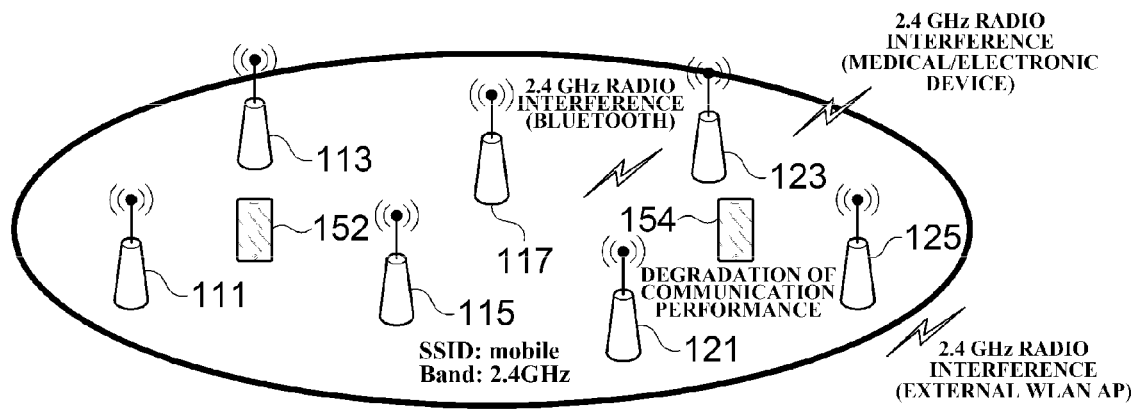
FIG. 1 schematically shows an exemplary configuration of a wireless local area network (WLAN)

A WLAN 200 is different from the WLAN 100 of FIG. 1 in that APs 141, 143, and 145 in an area 230 are configured to provide wireless connections using a 5 GHz frequency band. The WLAN 200 is configured in this manner to prevent the communication performance of the station 154 from being degraded by radio interference from medical/electronic devices, Bluetooth devices, APs of an external WLAN, and the like, which communicate in the 2.4 GHz frequency band through which, in the WLAN 100, the APs 121, 123, and 125 would provide wireless connections.

Oftentimes, when stations 152 and 154 continues to scan both of the 2.4 GHz and the 5 GHz frequency bands to discover a nearby AP 111, 113, 115, 117, 141, 143, or 145, an excessive number of such scanning operations may result in an undesirably long time delay. In particular, when an application susceptible to transmission delay, for example, a VoIP or video conference application, is executed in the stations 152 and 154, scanning all frequency bands that are used in the WLAN 200 may destabilize traffic flows from and/or to the stations 152 and 154. In order to prevent such resultant transmission delay and ensure a quality of service (QoS) of the application at a desired level, it may be preferable for the stations 152 and 154 to perform AP discovery only on a particular frequency band, in certain situations. For example, when the station 152 initially scans both of the 2.4 GHz and the 5 GHz frequency bands in an area 210 and then connects to the AP 113 that provides a wireless connection over the 2.4 GHz frequency band, the station 152 may fix the frequency band to be subsequently scanned to the 2.4 GHz frequency band. In the area 210 where the station 152 is located, such an AP discovery scheme is more efficient than a scheme of consistently scanning both the 2.4 GHz and 5 GHz frequency bands for use in the WLAN 200.

When the stations 152 and 154, set to scan a particular frequency band as mentioned above, move to an area in which wireless connections are provided in another frequency band, the stations 152 and 154 could fail to find any APs that use the particular frequency band and, therefore, might be disconnected from the WLAN 200. For example, when the station 152 set to scan only the 2.4 GHz frequency band in the area 210 moves to an area 230 for the 5 GHz frequency band, the station 152 discovers none of the APs 141, 143, and 145 that transmit information indicating the presence of the WLAN 200, for example, indicated as "SSID: mobile," using channels in the 5 GHz frequency band. Accordingly, the station 152 would lose a connection for providing a service (e.g., VoIP or video conference service) to the station 152.

Exemplary embodiments of the present disclosure provide techniques for sending, from a wireless device (e.g., an AP), information regarding a frequency band for use in providing a wireless connection in a wireless network (e.g., a WLAN) and allowing configuration of a frequency band to be subsequently scanned by a mobile device (e.g., a station) that receives the information, thereby ensuring service continuity at a sufficient level in a wireless network environment in which multiple frequency bands are used.

Figure 3:
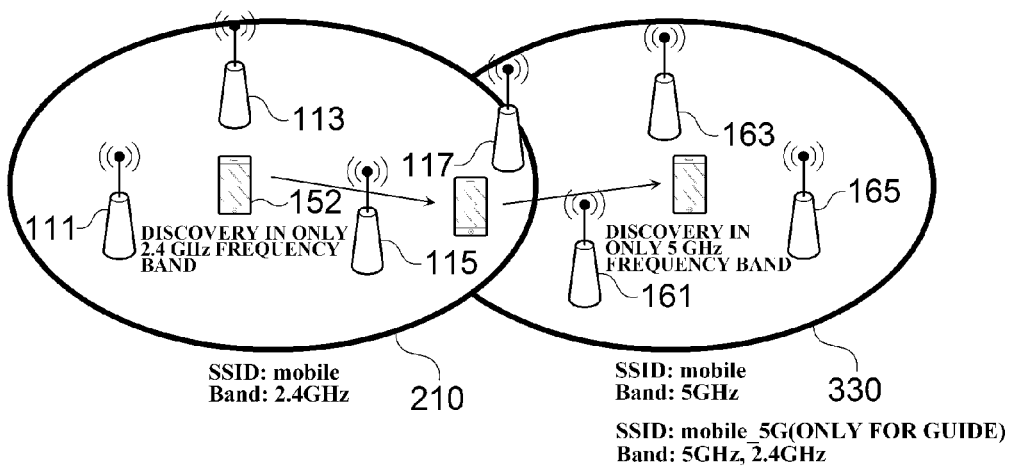
FIG. 3 shows a WLAN environment according to an exemplary embodiment of the present disclosure.

FIG. 3 shows a wireless local area network (WLAN) environment according to an exemplary embodiment of the present disclosure.

As shown in FIG. 3, an exemplary WLAN 300 includes access points (APs) 111, 113, 115, 117, 161, 163, and 165 and a station 152. The APs 111, 113, 115, and 117 in an area 210 deliver information indicating the presence of the WLAN 300, for example, a service set identifier indicated as "SSID: mobile," using a 2.4 GHz frequency band. The APs 161, 163, and 165 in an area 330 deliver information indicating the presence of the WLAN 300, for example, indicated as "SSID: mobile," using a 5 GHz frequency band. Also, each of the APs 161, 163, and 165 in the area 330 sends additional information indicating that it supports wireless connections over the 5 GHz frequency band in the WLAN 300 (in other words, the 5 GHz frequency band is used for wireless connections in the area 330). For example, each of the APs 161, 163, and 165 in the area 330 may have a functionality of transmitting (e.g., broadcasting or unicasting) a plurality of SSIDs and, thus, send an additional SSID (for example, indicated as "SSID: mobile_5G"). Such an additional SSID, which is used only to announce that the frequency band supported for connection by the APs 161, 163, and 165 is the 5 GHz frequency band, may be referred to as a guide SSID. In other words, the guide SSID does not indicate the network accessible via the APs 161, 163, and 165 or by the station 152. However, the guide SSID may be transmitted in the same way as an ordinary SSID, with the use of a predetermined value for identifying the guide SSID.

When the above-mentioned additional information is received at a station (e.g., the station 152) in the WLAN 300, the station may recognize that it can connect to the APs 161, 163, and 165 that provide wireless connections using the 5 GHz frequency band. Therefore, the station, when receiving the additional information, may operate to scan only the 5 GHz frequency band.

For example, the APs 161, 163, and 165 may transmit the guide SSID "mobile_5G" as well as the SSID "mobile" over the 2.4 GHz frequency band. When moving from the area 210 to the area 330 as indicated by the arrows in FIG. 3, the station 152 may receive the transmitted guide SSID. Therefore, in response to the reception of the guide SSID, the station 152 may change its AP discovery mode so that only the 5 GHz frequency band is scanned.

In addition, the APs 161, 163, and 165 may transmit the guide SSID "mobile_5G" over the 5 GHz frequency band. The guide SSID transmitted as above may be useful to a certain station entering the area 330. For example, it is assumed that an area in which an AP (not shown) is configured similarly to the APs 161, 163, and 165 and included in the WLAN 300 to support connections over the 5 GHz frequency band is adjacent to the area 330. Further, it is assumed that a certain station (not shown) may enter the area 330 after being set to scan only the 5 GHz frequency band in the area adjacent to the area 330. In this case, the station may receive the above guide SSID and recognize that the station is located in an area where the 5 GHz frequency band is used, to thereby maintain its already-established AP discovery mode.

When the guide SSID "mobile_5G" is sent in both of the 2.4 GHz and 5 GHz frequency bands as mentioned above, an area in which no guide SSID is detected may be considered as an area in which the 2.4 GHz frequency band is used. In view of the foregoing, when the station 152 fails to receive any guide SSID, the station 152 may restrict a frequency domain to be scanned to the 2.4 frequency band. For example, when the station 152 enters the area 210 in the reverse direction of the arrows shown in FIG. 3, the station 152 may change its AP discovery mode so that only the 2.4 GHz frequency band is scanned.

Figure 4:
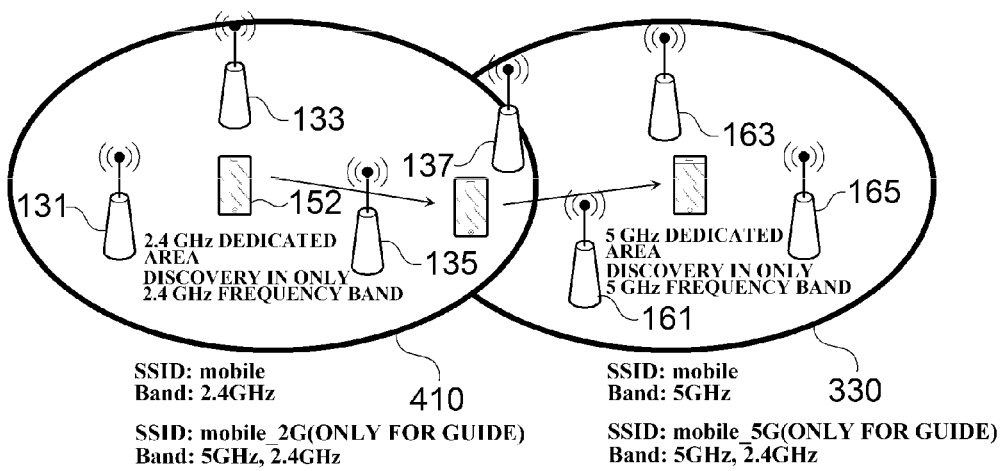
FIG. 4 shows a WLAN environment according to another exemplary embodiment of the present disclosure.

FIG. 4 shows a WLAN environment according to another exemplary embodiment of the present disclosure.

As shown in FIG. 4, a WLAN 400 includes APs 131, 133, 135, 137, 161, 163, and 165 and a station 152. The APs 161, 163, and 165 in an area 330 operate in the same manner as described above with reference to FIG. 3. Meanwhile, as shown in FIG. 4, a guide SSID may be sent in an area 410 of the WLAN 400 as is done in the area 330. Specifically, each of the APs 131, 133, 135, and 137 in the area 410 use the 2.4 GHz frequency band to send information indicating the presence of the WLAN 400 (e.g., indicated as "SSID: mobile"), and also additional information indicating that it provides connections over the 2.4 GHz frequency band in the WLAN 400 (in other words, the 2.4 GHz frequency band is used for connections in the area 410). Therefore, a station that receives the additional information may operate to scan only the 2.4 GHz frequency band. To this end, the additional information may be sent in the 2.4 GHz and 5 GHz frequency bands.

Since each of the APs 131, 133, 135, and 137 in the area 410 may have a function of broadcasting a plurality of SSIDs, the additional information from the APs 131, 133, 135, and 137 may include a guide SSID for announcing that the frequency band supported by the APs 131, 133, 135, and 137 is the 2.4 GHz frequency band. For example, as shown in FIG. 4, each of the APs 131, 133, 135, and 137 may send a guide SSID "mobile_2G" as well as an SSID "mobile."

As mentioned above, the APs 161, 163, and 165 in the area 330 may send the SSID "mobile" and the guide SSID "mobile_5G," and the APs 131, 133, 135, and 137 in the area 410 may send the SSID "mobile" and the guide SSID "mobile_2G." In the WLAN 400, when the station 152 moves from the area 410 to the area 330 in the direction indicated by the arrows shown in FIG. 4, the station 152 may receive the guide SSID "mobile_5G" and in response thereto, may restrict a frequency band to be scanned only to the 5 GHz frequency band, instead of the 2.4 frequency band. Also, when the station 152 moves from the area 330 to the area 410 in the reverse direction of the arrows shown in FIG. 4, the station 152 may receive the guide SSID "mobile_2G"

and change its AP discovery modes so that a subsequent scanning operation is performed only on the 2.4 GHz frequency band. Meanwhile, when a certain station still receives an identical guide SSID while moving, e.g., between the two areas 330 and 410 in the WLAN 400, the station can maintain its AP discovery mode, although it is not shown in FIG. 4. For example, when the station is set to scan only the 5 GHz frequency band and detects the SSID "mobile_5G," the station may still perform AP discovery only on the 5 GHz frequency band.

Figure 5:
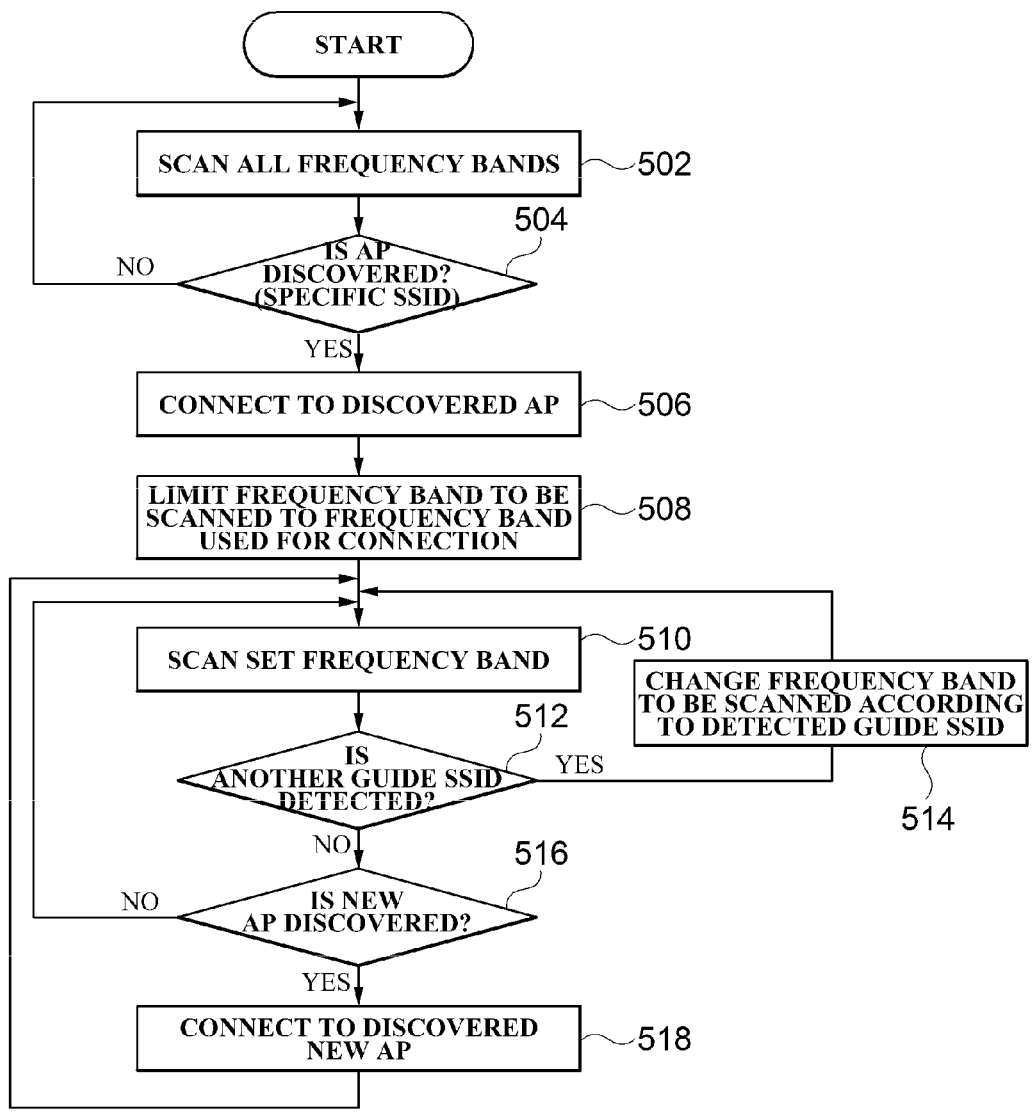
FIG. 5 is a flowchart of an exemplary process in which a station sets a frequency band to be scanned, discovers an access point (AP), and connects to the AP in a WLAN according to a certain embodiment of the present disclosure.

Illustration of Transmission of Information Regarding Supported Frequency Band Using a Guide SSID FIG. 5 is a flowchart of an exemplary process in which a station sets a frequency band to be scanned, discovers an AP, and connects to the AP in a WLAN according to a certain embodiment of the present disclosure.

For example, a process 500 illustrated in FIG. 5 may be performed by the station 152 in the WLAN 400. When the process 500 is initiated, the station 152 scans both of the 2.4 GHz and 5 GHz frequency bands for AP discovery as an initial operation (502). Such a mode for discovering an AP as mentioned above may be referred to as a full-band scanning mode. When the whole bands for use in the WLAN 400 are scanned, but the discovery of an AP that uses a particular SSID (e.g., the SSID "mobile") to announce its own presence fails (504), the station 152 continues to discover an AP in the full-band scanning mode (502).

When an AP sending the particular SSID (e.g., the SSID "mobile") is discovered (504), the station 152 connects to the discovered AP (506).

A frequency band to be subsequently scanned by the station 152 is limited to the frequency band used by the station 152 to connect to the discovered AP (508). Such an AP discovery mode of the station 152 may be referred to as a limited band scanning mode.

Scanning of the frequency band set as mentioned above is started (510).

When, in the course of the scanning (510), a guide SSID indicating that there exists an AP to provide wireless connections over a frequency band different from the currently-scanned frequency band is not detected (512), it can be said that the station 152 does not need to change the frequency band to be scanned. In such a case, when an AP to be newly connected with the station 152 is not discovered (516), the process 500 continues to the scanning (510) of the currently-set frequency band. When an AP to be newly connected with the station 152 is discovered (516), the station 152 connects to the new AP (518), and then performs the scanning (510) of the already-set frequency band, which is also used for the new connection.

When, in the course of the scanning (510), a guide SSID indicating that there exists an AP to provide wireless connections over a frequency band different from the currently-scanned frequency band is detected (512), the frequency band to be scanned by the station 152 is changed according to the detected guide SSID (514). Then, scanning of the changed frequency band is performed (510), and the subsequent operations may be repeated in a similar manner.

As a detailed illustration, when the station 152 moves in the WLAN 400 along the arrows of FIG. 4, the process 500 of FIG. 5 may be performed as follows. The station 152 that may be present in the WLAN 400 is initialized and scans both of the 2.4 GHz and 5 GHz frequency bands (502). When both of the frequency bands are scanned, but none of the APs 131, 133, 135, 137, 161, 163, and 165 transmitting the SSID "mobile" are discovered (504), the station 152 continues the AP discovery in the full-band scanning mode (506). When the station 152 is present in the area 410 of the WLAN 400 and discovers the AP 133 transmitting the SSID "mobile" as an AP to which to connect (504), the station 152 connects to the AP 133. As shown in FIG. 4, the AP 133 provides wireless connections over the 2.4 GHz frequency band. The station 152 limits the frequency band to be subsequently scanned to the 2.4 GHz frequency band (508). Then, the station 152 scans only the 2.4 GHz frequency band (510). When, in the course of the scanning (510), the guide SSID "mobile_2G" is detected, and the guide SSID "mobile_5G" is not detected (512), the station 152 operates as follows. When the 2.4 GHz frequency band is scanned, but an AP to which the station 152 is to newly connect is not discovered (516), the connection between the station 152 and the AP 133 is maintained as it is, and the 2.4 GHz frequency band is scanned again (510). On the other hand, when the AP 137 is discovered as an AP to which the station 152 is to newly connect (516), the station 152 connects to the AP 137 and then still scans only the 2.4 GHz frequency band (510). Meanwhile, when the station 152 is set to scan only the 2.4 GHz frequency band but detects the guide SSID "mobile_5G," the frequency band to be scanned by the station 152 is changed from the 2.4 GHz frequency band to the 5 GHz frequency band (514). When the station 152 does not need to scan the 2.4 GHz frequency band again, the station 152, which is now allowed to scan the 5 GHz frequency band as mentioned above, would discover, for example, the AP 163 supporting the 5 GHz frequency band, as an AP to which to connect (516), and connects to the AP 163 (518). Subsequent scanning is performed on the 5 GHz frequency band (510). The subsequent operations are similar to those subsequent to the scanning (510) of the 2.4 GHz frequency band.

Illustration of Transmission of Information Regarding Supported Frequency Band Using a Load Balancing Parameter As mentioned above, the WLAN 300 and the WLAN 400 utilize guide SSIDs transmitted from the APs 131, 133, 135, 137, 161, 163, and 165, each of which is capable of sending a plurality of SSIDs, to provide service continuity to the station 152 moving between areas in which different frequency bands are used. A guide SSID may be transmitted as being included in a frame having the same format as a management frame that is available for transmission of a common SSID, for example, a beacon frame, a probe response frame, etc., in accordance with the IEEE 802.11 standard. However, such an exemplary embodiment of the present disclosure is not restrictive. For example, in another exemplary embodiment of the present disclosure, in order to transmit information indicating a frequency band that it uses to provide wireless connections, each of the APs 131, 133, 135, 137, 161, 163, and 165 may add the information as a new parameter into an ordinary beacon frame or an ordinary probe response frame. Further, since the APs 131, 133, 135, 137, 161, 163, and 165 supporting both the 2.4 GHz and the 5 GHz frequency bands may require a functionality of adjusting loads between both of the frequency bands, the newly added parameter may be used to indicate a load balancing policy for the frequency bands. A configuration of such a load balancing parameter and a frequency band(s) to be scanned by a station according to the parameter may be determined in consideration of the capacity, the complexity, and/or the degree of interference of each frequency band.

By way of example, a parameter including two bits given in Table 1 may be inserted in a beacon frame or a probe response frame to be transmitted from the APs 131, 133, 135, 137, 161, 163, and 165. For example, when the APs 161, 163, and 165 set the two bits to "10" and transmit the parameter in the WLAN 300 or the WLAN 400, the station 152 receiving the parameter may operate to scan only the 5 GHz frequency band as described above with reference to FIGS. 3 and 4. Further, when the APs 131, 133, 135, and 137 set the two bits to "01" and transmit the parameter in the WLAN 400, the station 152 receiving the parameter may operate to scan only the 2.4 GHz frequency band as described above with reference to FIG. 4. Meanwhile, when the two bits included in the parameter transmitted from the APs 131, 133, 135, 137, 161, 163, and 165 are "00," the station 152 receiving the parameter may perform scanning according to a predetermined load balancing policy.

TABLE 1

| Two additional bits | Meaning |
|---|---|
| 00 | 2.4 GHz and 5 GHz frequency bands both are supported. |
| 01 | Only 2.4 GHz frequency band is supported. |
| 10 | Only 5 GHz frequency band is supported. |
| 11 | Reserved |

As another example, a parameter including three bits given in Table 2 below may be inserted in a beacon frame or a probe response frame to be transmitted from the APs 131, 133, 135, 137, 161, 163, and 165. These three bits indicate a probability that a station receiving the three bits would select for scanning the 5 GHz frequency band. For example, the station receiving the parameter including the three bits may generate a random value X of [0, 1). When the generated value X is smaller than the probability indicated by the received three bits, the station may be set to scan the 5 GHz frequency band. Otherwise, the station may be set to scan the 2.4 GHz frequency band.

TABLE 2

| Three additional bits | Meaning (probability that 5 GHz frequency band would be selected as a frequency band to be scanned) |
|---|---|
| 000 | 0 |
| 001 | 0.15 |
| 010 | 0.3 |
| 011 | 0.5 |
| 100 | 0.65 |
| 101 | 0.85 |
| 110 | 0.9 |
| 111 | 1.0 |

Ensuring of Service Continuity for a Terminal that Does Not Support a Particular Frequency Band For example, when the station 152 supports only the 2.4 GHz frequency band in the WLAN 300 or the WLAN 400, the station 152 cannot connect to the APs 161, 163, and 165 that support only the connections over the 5 GHz frequency band in the area 330, even if the station 152 enters the area 330. Therefore, in order to prevent an interruption to the service provided to the station 152, a certain AP that sends an SSID dedicated to the station 152, for example, indicated as "SSID: mobile_2G," in the 2.4 GHz frequency band may be placed in the area 330. When a moderate number of stations that do not support the 5 GHz frequency band but support only the 2.4 GHz frequency band exist in the WLAN 300 and the WLAN 400, such an approach may be useful to provide service continuity to the stations while reducing radio interference caused in the area 330 by the 2.4 GHz frequency band.

Figure 6:
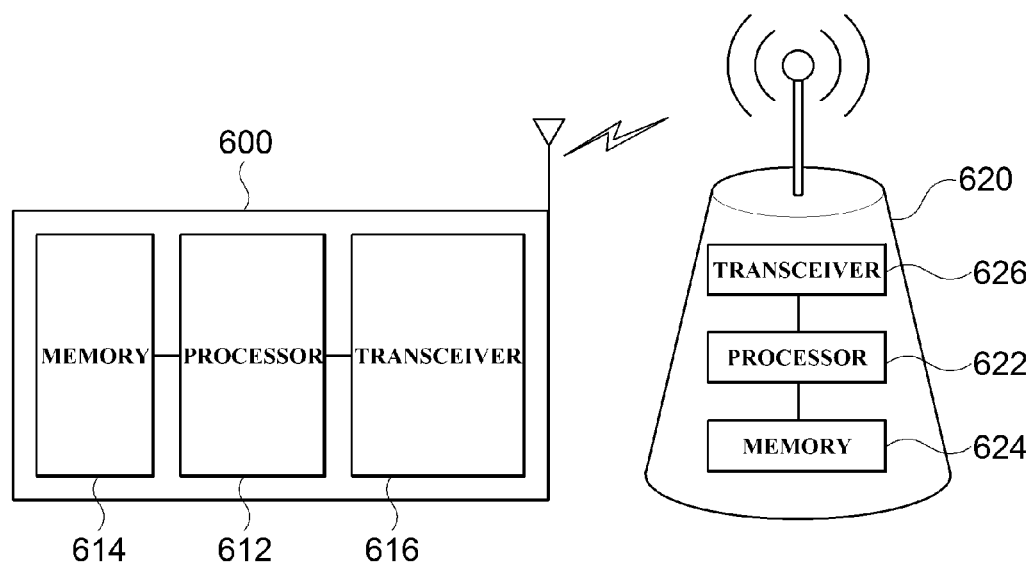
FIG. 6 shows block diagrams of a wireless device and a mobile device for implementing an exemplary embodiment of the present disclosure.

FIG. 6 shows block diagrams of a wireless device and a mobile device for implementing an exemplary embodiment of the present disclosure.

A mobile device 600 includes a processor 612, a memory 614, and a transceiver 616. A wireless device 620 includes a processor 622, a memory 624, and a transceiver 626. The mobile device 600 may be a station (e.g., the stations 152 and 154) in a WLAN. The wireless device 620 may be an AP (e.g., the APs 111, 113, 115, 117, 121, 123, 125, 131, 133, 135, 141, 143, 145, 161, 163, and 165) in the WLAN.

The transceivers 616 and 626 are connected to the processors 612 and 622 to exchange radio signals under the control of the processors 612 and 622, respectively. For example, the transceivers 616 and 626 may implement the physical layer conforming to the IEEE 802.11 standard. According to the above-described exemplary embodiments of the present disclosure, the processors 612 and 622 may operate the devices 600 and 620, respectively. The processors 612 and 622 may execute instructions stored in the memories 614 and 624, respectively. When the instructions stored in the memories 614 and 624 are executed by the processors 612 and 622, respectively, the devices 600 and 620 may be caused to perform operations according to the above-described exemplary embodiments of the present disclosure. The memories 614 and 624 may be inside or outside the processors 612 and 622, respectively, and connected to the processors 612 and 622 by various well-known means, respectively.

Meanwhile, an exemplary embodiment of the present disclosure can include a computer-readable storage medium including a program for performing the methods described herein on a computer. The computer-readable storage medium may separately include program commands, local data files, local data structures, etc. or include a combination of them. The computer-readable storage medium may be specially designed and configured for the present disclosure, or known and available to those of ordinary skill in the field of computer software. Examples of the computer-readable storage medium include magnetic media, such as a hard disk, a floppy disk, and a magnetic tape, optical recording media, such as a CD-ROM and a DVD, magneto-optical media, such as a floptical disk, and hardware devices, such as a ROM, a RAM, and a flash memory, specially configured to store and execute program commands. Examples of the program commands may include high-level language codes executable by a computer using an interpreter, etc., as well as machine language codes made by compilers.

According to exemplary embodiments of the present disclosure, it is possible to maintain a high quality of service (QoS) and ensure service continuity for a mobile device that is provided with a service through a wireless network in which multiple frequency bands are used.

It will be apparent to those familiar with this field that various modifications can be made to the above-described exemplary embodiments of the present disclosure without departing from the spirit or scope of the present disclosure. Thus, it is intended that the present disclosure covers all such modifications provided they come within the scope of the appended claims and their equivalents.

What is claimed is:

1. A communication method implemented by a mobile device in a wireless network in which a plurality of frequency bands is available, wherein a first wireless device and a second wireless device in the wireless network are configured to use a first one and a second one of the plurality of frequency bands, respectively, to provide wireless connections, the communication method comprising:

while the mobile device is connected to the second wireless device, receiving a frame which includes information indicating that the first wireless device is configured to use the first frequency band to provide a wireless connection, the frame being transmitted from the first wireless device in the second frequency band and received through a scanning operation performed by the mobile device only on the second frequency band; and in response to receiving the frame, allowing a subsequent scanning operation of the mobile device to be performed only on the first frequency band.

2. The communication method of claim 1, wherein the frame has an identical format as a management frame which is received by the mobile device so as to be used in a scan to search for a connectable wireless device in the wireless network.

3. The communication method of claim 2, wherein the frame is a beacon frame or a probe response frame.

4. The communication method of claim 2, wherein the information is included in the frame as a guide service set identifier (SSID).

5. The communication method of claim 4, wherein the guide SSID is unavailable to indicate a network accessible by the mobile device.

6. The communication method of claim 4, wherein the frame is different from a management frame which includes an SSID indicating presence of the wireless network and which is transmitted from the first wireless device.

7. The communication method of claim 1, wherein the plurality of frequency bands includes a 2.4 GHz band and a 5 GHz band.

8. The communication method of claim 1, wherein the wireless network is a wireless local area network (WLAN) conforming to an Institute of Electrical and Electronics Engineers (IEEE) 802.11 standard, wherein both of the first wireless device and the second wireless device are access points (APs) compatible with the IEEE 802.11 standard, and wherein the mobile device is a mobile station compatible with the IEEE 802.11 standard.

9. A communication method implemented by a wireless device in a wireless network in which a plurality of frequency bands is available, the wireless device being configured to use a first one of the plurality of frequency bands to provide wireless connections, the communication method comprising:

generating a frame which includes information indicating that the wireless device is configured to use the first frequency band to provide a wireless connection; and transmitting the frame in the first frequency band and a second one of the plurality of frequency bands such that the frame is received by a mobile device performing a scanning operation only on the first frequency band and by another mobile device performing a scanning operation only on the second frequency band.

10. The communication method of claim 9, wherein the frame has an identical format as a management frame which is transmitted by the wireless device so as to be used in a scan to search for a connectable wireless device in the wireless network.

11. The communication method of claim 10, wherein the frame is a beacon frame or a probe response frame.

12. The communication method of claim 10, wherein the information is included in the frame as a guide service set identifier (SSID).

13. The communication method of claim 12, wherein the guide SSID is unavailable to indicate a network accessible via the wireless device.

14. The communication method of claim 12, wherein the frame is different from a management frame which includes an SSID indicating presence of the wireless network and which is transmitted from the wireless device.

15. The communication method of claim 9, wherein the plurality of frequency bands includes a 2.4 GHz band and a 5 GHz band.

16. The communication method of claim 9, wherein the wireless network is a wireless local area network (WLAN) conforming to an Institute of Electrical and Electronics Engineers (IEEE) 802.11 standard, wherein the wireless device is an access point (AP) compatible with the IEEE 802.11 standard, and wherein the mobile devices are mobile stations compatible with the IEEE 802.11 standard.

17. A computer-readable storage medium having computer executable instructions stored thereon which, when executed by a mobile device in a wireless network in which a plurality of frequency bands is available, implement a communication method, wherein a first wireless device and a second wireless device in the wireless network are configured to use a first one and a second one of the plurality of frequency bands, respectively, to provide wireless connections, the communication method comprising:

while the mobile device is connected to the second wireless device, receiving a frame which includes information indicating that the first wireless device is configured to use the first frequency band to provide a wireless connection, the frame being transmitted from the first wireless device in the second frequency band and received through a scanning operation performed by the mobile device only on the second frequency band; and in response to receiving the frame, allowing a subsequent scanning operation of the mobile device to be performed only on the first frequency band.

18. A computer-readable storage medium having computer executable instructions stored thereon which, when executed by a wireless device in a wireless network in which a plurality of frequency bands is available, implement a communication method, the wireless device being configured to use a first one of the plurality of frequency bands to provide wireless connections, the communication method comprising:

generating a frame which includes information indicating that the wireless device is configured to use the first frequency band to provide a wireless connection; and transmitting the frame in the first frequency band and a second one of the plurality of frequency bands such that the frame is received by a mobile device performing a scanning operation only on the first frequency band and by another mobile device performing a scanning operation only on the second frequency band.

\* \* \* \* \*